Dec. 30, 1924.

F. O. WALTY 1,521,140

ANTISKID CHAIN

Filed Aug. 4, 1921

Inventor
Frank O. Walty
By Lancaster and Allwine
Attorneys

Dec. 30, 1924. 1,521,140
F. O. WALTY
ANTISKID CHAIN
Filed Aug. 4, 1921 3 Sheets-Sheet 2
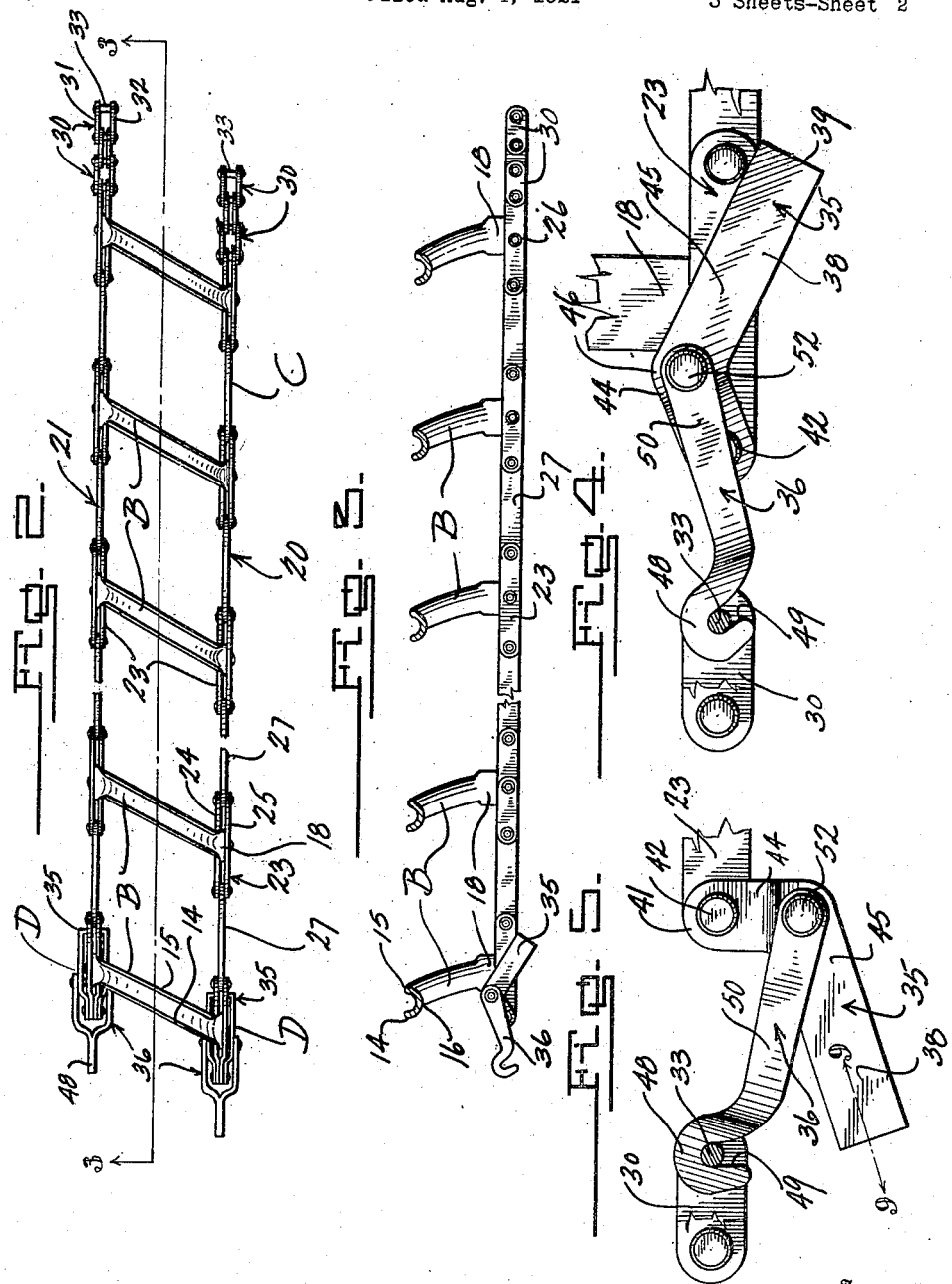
Inventor
Frank O. Walty
By Lancaster and Allwine
Attorney Dec. 30, 1924.
F. O. WALTY.
ANTISKID CHAIN
Filed Aug. 4, 1921
1,521,140
3 Sheets-Sheet 3
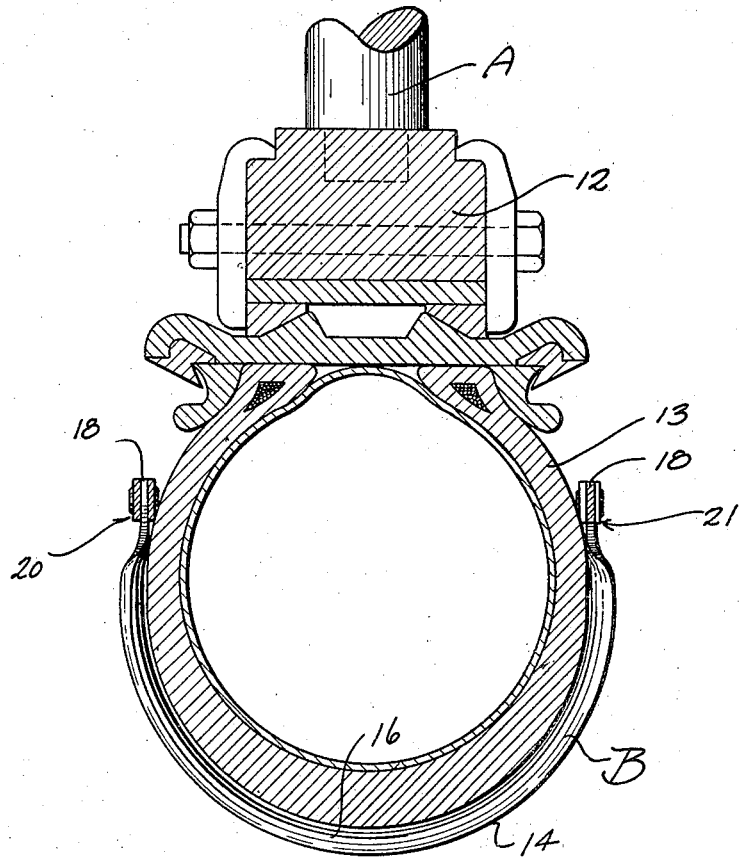
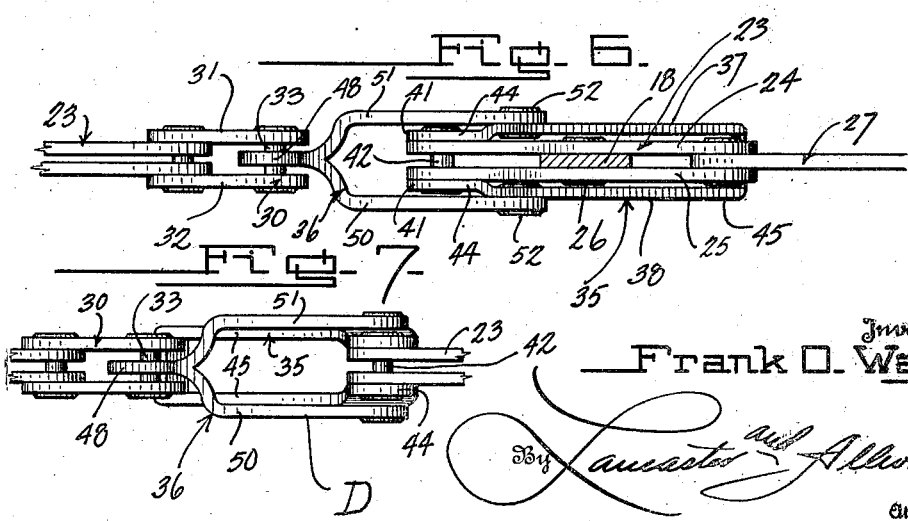
Inventor
Frank O. Walty
By Lancaster and Allwine
Attorneys Patented Dec. 30, 1924.

1,521,140

UNITED STATES PATENT OFFICE.

FRANK O. WALTY, OF AVOCA, WISCONSIN.

ANTISKID CHAIN.

Application filed August 4, 1921. Serial No. 489,781.

*To all whom it may concern:*

Be it known that I, FRANK O. WALTY, a citizen of the United States, residing at Avoca, in the county of Iowa and State of Wisconsin, have invented certain new and useful Improvements in Antiskid Chains, of which the following is a specification.

This invention relates to improvements in anti-skidding devices for use upon vehicle wheels.

The primary object of the invention is the provision of an anti-skid chain, including traction elements of novel formation, adapted for engaging a vehicle tire in a transverse manner to provide an effective ground engaging arrangement.

A further object of the invention is the provision of an anti-skid chain of the above described character, including an improved clamping and tightening device, for securing the ends of a tire chain for assembling the same to a vehicle wheel.

A further object of the invention is the provision of a rigid traction element, the axis of which is arranged in spiral formation for substantially one-half of a circumference.

Other objects and advantages will be apparent during the course of the following detailed description.

In the accompanying drawings, forming a part of this specification, and in which similar reference characters designate corresponding parts throughout the several views, Figure 1 is a side elevation of a vehicle wheel, showing the improved anti-skid chain attached thereto.

Figure 2 is a plan view of a length of the tire chain, and showing the arrangement of details thereof.

Figure 3 is a longitudinal cross sectional view taken on the line 3—3 of Figure 2.

Figure 4 is a side elevation of the improved clamping and tightening device, showing the same in position to lock the ends of a tire chain in proximate relation.

Figure 5 is a side elevation of the improved clamping and tightening device, showing the same in open position for releasing the tire chain.

Figure 6 is a plan view showing the arrangement of the clamping and tightening device, and as illustrated in Figure 4.

Figure 7 is a plan view of the clamp as illustrated in Figure 5.

Figure 8 is a transverse cross sectional view through a tire mounted upon the rim of a vehicle wheel, and showing the manner in which a traction element is assembled upon the crown of a tire.

Figure 1:
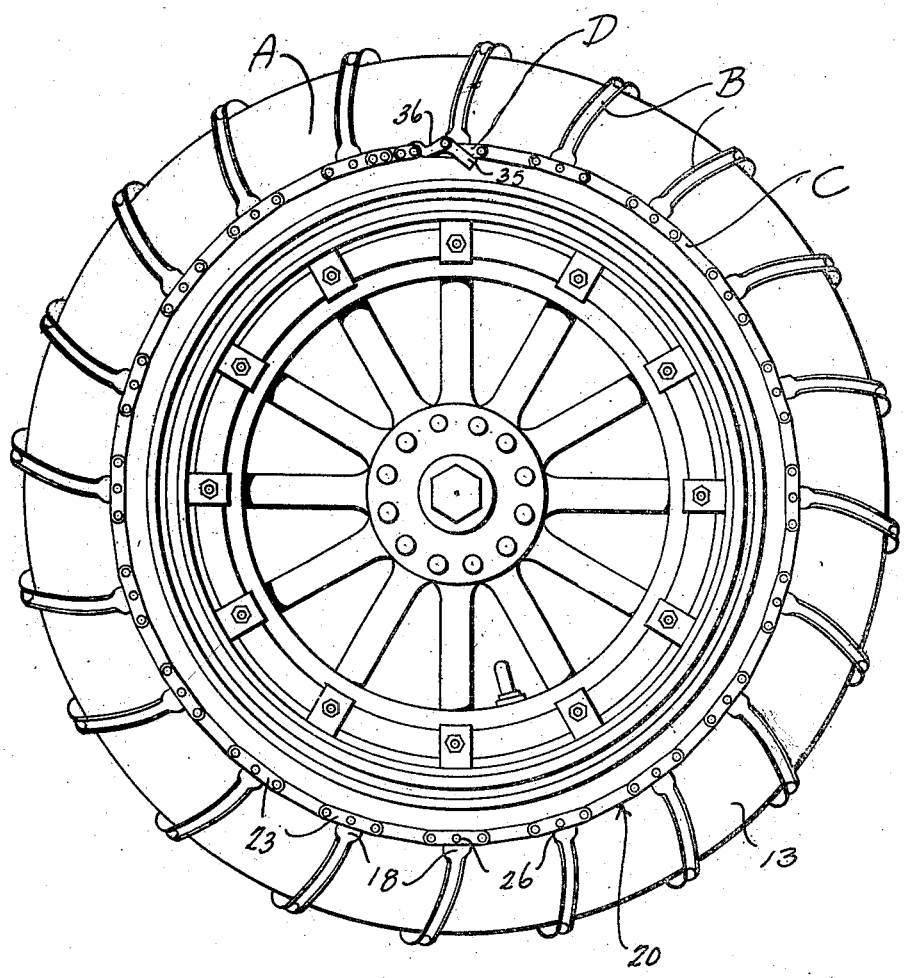
Figure 9:
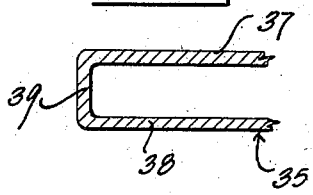
Figure 9 is a fragmentary cross sectional view taken on the line 9—9 of Figure 5.

In the drawings, wherein for the purpose of illustration is shown the preferred embodiment of my invention, the letter A designates a vehicle wheel of any approved formation, having the traction elements B mounted thereon and held in spaced chain like formation by the means C; said elements B and chain means C adapted for clamped engagement upon the vehicle wheel A, by the improved lock means D.

The vehicle wheel A may of course be of any formation, and preferably includes a rim 12, having the tire 13 mounted thereon.

The traction elements B are all of similar formation and preferably comprise a channel shaped piece of rigid metal, bent in spiral formation for substantially one half of a circumference, and for a purpose to be subsequently set forth. It is preferred that the channel legs 14 and 15 be arranged for ground engagement and connected by the arcuate bight portion 16, the under surface of which is adapted for engaging the crown and sides of the tire 13. The extreme ends 18 of each element B are preferably flattened, in such manner, that said flattened ends 18 lie substantially parallel with respect to each other, and likewise with respect to the planes of the side faces of the rim of the wheel A.

The means C for connecting the traction elements B preferably comprise the chain sections 20 and 21 for engaging the flattened ends 18 of the various elements B, and for overlying the sides of the tire 13, as in ordinary anti-skid chain formation. The side chains 20 and 21 are similar in formation, and include the link elements 23 formed of plates 24 and 25, centrally pivoted at 26 upon the inside and outside respectively, of a flattened end 18. By this arrangement, the plates 24 and 25 of the links 23 are held in spaced relation, and are adapted for receiving the single plate link elements 27 in pivotal manner upon their extreme ends, and for connecting the various members 23 in chain like formation; for flexibly mounting the various traction members B as an anti-skid unit. The arrangement of the side pieces 20 and 21 is desirable, in that by this arrangement of links 23 and 27, the chain retains a maximum degree of strength, consistent with the economic manner in which the same may be manufactured.

One end of each of the chain sides 20 and 21 is provided with a clamping and tightening device D, the other end of each of said side pieces 20 and 21 having a plurality of special links 30 mounted thereon. The links 30 are connected in pivotal manner and comprise a pair of spaced side plates 31 and 32 connected by the pin elements 33, which provide a shank portion intermediate the plates 31 and 32, and for cooperation with the clamp means D in a manner to be subsequently set forth.

The clamping and tightening devices D preferably comprise a substantially J-shaped lever 35, and a hook member 36 pivotally connected thereto. The levers 35 are formed of a single piece of material, bent in such manner as to provide the side portions 37 and 38 of similar J-shaped formation and connected by a bight portion 39. The forward free ends 41 of the side arms 37 and 38 are pivotally connected, as at 42, to the outsides of the plates of one of the link members 23, and which is positioned upon the extreme end of each of the side chains 20 and 21. It is preferred, that each leg 44 which is thus pivotally connected to the link element 23 be shorter than the leg 45 of each of the side portions 38 and 39; said legs 44 and 45 of course, being connected at a bight portion 46. The side portions 37 and 38 forming the lever 35 are so shaped as to receive the link element 23 therein, the lever 35 being capable of oscillating upon its pivoted end to the link 23, and being prevented from rotation thereon by engagement of the bight portion 39 of said lever with a marginal edge of a link forming a side chain.

The hook member 36 is provided with a hook head 48 provided with a pin receiving recess 49 therein. Legs 50 and 51 extend in yoke formation from the head 48 and are spaced apart, whereby the free edge of the same may be pivotally connected by rivets 52 to the bight portions 46 of each of the sides 37 and 38 of a lever 35.

Due to the spiral formation of the link elements B, one end of each of said elements will be positioned forwardly of the other end, when the same is mounted upon a vehicle wheel A. This arrangement can be readily seen when observing the relative position of the various elements B and the side pieces 20 and 21, and as illustrated in Figure 2 of the drawings.

In assembling, the improved tire chain is positioned upon the tire 13 of a vehicle wheel A in such manner that the side chains 20 and 21 engage the sides of the tire 13, and the various elements B are positioned in spiral formation across the crown of the tire 13. By this arrangement, the spiral axis of each member B is arranged at an acute angle to the longitudinal axis of tire 13. As illustrated in Figure 5, the lever 35 is moved downwardly away from the side chains 20 or 21 to which the same is affixed; this throwing the pivot point 52 of the hooked member 36 parallel with, or even forwardly of the pivot point 42 of lever 45, and toward the hooking links 30. When the lever 35 is in this open position, the hook member 36 is swung downwardly until the same engages a pin 33; the chains 20 and 21 of course, having been tensioned as far as is possible, before closing the lever 35. When a hook member 36 properly engages the pin 33, the lever 35 can be swung on each end of the tire chain, and away from the end of the chain upon which the links 30 are provided. By this movement, the pivot point 52 of the hook member is moved rearwardly of the pivot point 42, and the hook member 36 is drawn rearwardly to move the ends of a side chain into proximate relation. When the lever 35 has been completly closed, as illustrated in Figure 4, the pivot points 52 of the hook member 36 is disposed upwardly of the pivot point 42, and consequently above the line of circumferential tension of the side chain to which the device D is attached. Tension upon this side chain, of course, tends to further oscillate the lever 35 upon its pivot pin 42; this being prevented by the fact that the bight portion 39 of said lever 35 engages, as is clearly shown in Figure 4, the underside or marginal edge of the side chain. It will consequently be impossible for either the side chains 20 or 21, when the devices D thereon are in clamped or tightened engagement, to become accidentally released.

From the foregoing, it can be seen that an anti-skid arrangement for vehicle wheels has been provided, which by the peculiar arrangement of anti-skid traction elements is assured of a practically continuous grip upon a road surface.

Various changes in the shape, size and arrangement of parts may be made to the form of the invention herein shown and described, without departing from the spirit of the invention or the scope of the claim.

I claim:

In an anti-skid device, the combination of a plurality of U-shaped traction elements adapted to straddle a tire with their arms extending toward a wheel rim and terminating in flat parallel end portions, and chain devices for the ends of said traction elements each embodying links pivotally connected intermediate their ends to the flat ends of the traction elements and formed of pairs of plates pivotally connected upon opposite sides of the flat ends of the arms of said traction elements, and connecting links each formed of a single plate and having their ends pivotally mounted between the ends of the links which are pivotally connected to the flat ends of the arms of the traction elements.

FRANK O. WALTY.